United States Patent [19]
Dallach et al.

[11] 3,746,466
[45] July 17, 1973

[54] ADJUSTING AND LOCKING DEVICE

[75] Inventors: Gerd Dallach, Rostock-Lutten-Klein; Alfred Dudszus, Rostock; Lothar Fretwurst, Rostock-Warnemunde; Jochen Granz; Dietrich Schlottmann, both of Rostock, all of Germany

[73] Assignee: Veb Dieselmotorenwerk, Rostock, Germany

[22] Filed: June 25, 1971

[21] Appl. No.: 156,642

[52] U.S. Cl. ............................ 416/153, 416/157
[51] Int. Cl. ............................................. B63h 1/06
[58] Field of Search .................. 416/153, 154, 157, 416/157 A, 156, 174

[56] References Cited
UNITED STATES PATENTS

| | | | |
|---|---|---|---|
| 2,355,039 | 8/1944 | Eves | 416/157 |
| 2,786,539 | 3/1957 | Nichols | 416/154 X |
| 3,125,960 | 3/1964 | Chilman | 416/157 X |
| 3,219,121 | 11/1965 | Barden | 416/154 |
| 3,240,275 | 3/1966 | Bennett | 416/157 X |
| 3,459,267 | 8/1969 | Chilman | 416/157 |

FOREIGN PATENTS OR APPLICATIONS

| | | | |
|---|---|---|---|
| 922,918 | 2/1947 | France | 416/157 |
| 954,911 | 6/1949 | France | 416/157 |
| 1,260,746 | 4/1961 | France | 416/154 |
| 1,019,046 | 11/1957 | Germany | 416/157 |
| 399,368 | 3/1966 | Switzerland | 416/157 |

*Primary Examiner*—Everette A. Powell, Jr.
*Attorney*—Albert C. Nolte et al.

[57] ABSTRACT

In combination with a propeller mounted on a shaft and having blades each mounted for rotation about a respective axis transverse to the axis of the shaft to adjust the blade pitch, a yoke mounted for displacement parallel to the axis of the shaft, means operatively connecting the yoke to the blades for converting the displacement of the yoke into rotation of the blades about the respective axes, the yoke being expansibly fitted on the shaft by an hydraulically operable expansion joint, an annular groove being formed at the joint, means forming a chamber at each axial end of the yoke, a pump, conduit means communicating between the pump and the working chambers and the annular groove, and shuttle valve means for opening communication between the pump and either one of the chambers and simultaneously closing communication between the pump and the other of the chambers the application of oil to the groove freeing the yoke for movement as oil is admitted to one or other of said chambers.

7 Claims, 1 Drawing Figure

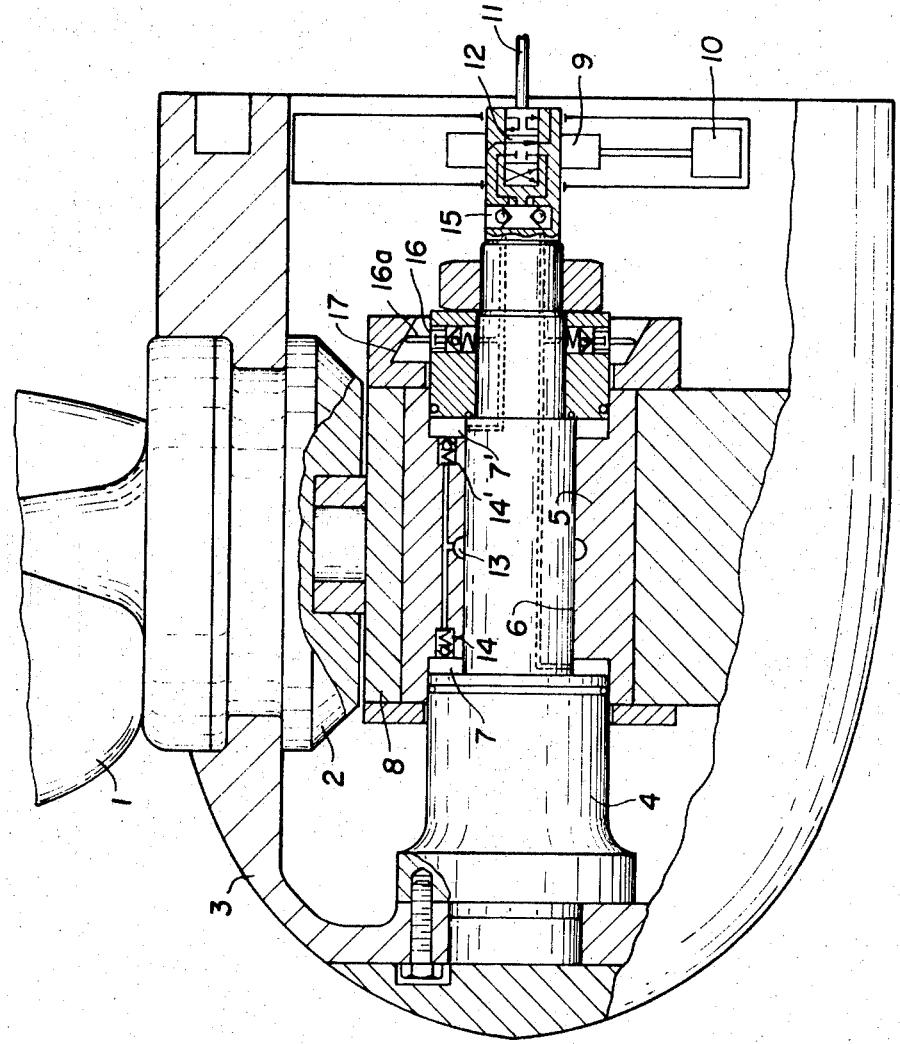

ADJUSTING AND LOCKING DEVICE

This invention relates to an adjusting and locking device, particularly for the adjustment of the pitch and locking of the pitch of rotatably mounted propeller blades, "propeller" hereinafter being intended to be generic to propellers and impellers.

Adjusting devices for rapid adjustment of the pitch of propeller blades are known in which the adjustment is effected by an adjusting motor through a gear drive or a yoke-pushrod unit and transmitted to the propeller blades. The adjusting motor can be operated electrically or hydraulically. Also known are hydraulically operated piston servo-motors which are arranged between the propeller blades. Though these adjusting devices perform the functions for which they are intended, they are too complicated and too uneconomical for the type of use involving only optimization of the output of the driving engine by adjustment of the pitch of the propeller over a small range.

It has, therefore, been suggested to effect the latter adjustments by means of elastic bodies which are actuated by the controlled supply and elimination of thermal energy. But this adjusting mechanism has the disadvantage that it is too complicated in its construction for the transmission of energy with the use of materials presently known for expansion joints. Furthermore, response time tends to be too long. Finally, this type of adjusting device, as well as the other known adjusting devices, requires additional means for reliable locking of the propeller blades in the respective operating positions.

It is an object of the invention to provide a device for adjusting and locking propeller blades, thereby to adjust the pitch of the propeller blades for optimization of the output of the driving engine.

Other objects of the invention will become apparent from the following description.

According to the invention, there is provided an adjusting and locking device for rotatably mounted propeller blades in which the parts move only a short distance in adjusting the blades and the blades are reliably locked in any operating position to which they are adjusted.

In greater detail, according to the invention, a yoke arranged on a hub shaft rigidly connected to the housing of the hub of the propeller and/or the propeller shaft or a part connected to the yoke is detachably connected to the hub housing, the propeller shaft or any other part secured to the hub or propeller by means of a hydraulically operated expansion connection, and working chambers of variable volume are provided for the variable adjustment of the yoke relative to the stationary parts between the yoke or parts thereof and parts secured to the hub and/or the propeller shaft which latter parts are in operative connection with the hydraulically operable expansion unit.

The desired adjusting movement of the yoke is started when an equilibrium has been established between the frictional force of the expansion unit, i.e., the pressure of the press fit of the yoke, and the hydraulic axial force and the oil pressure of the oil press unit manifests itself to the same extent in one of the working chambers. The adjusting movement is completed when the oil pressure is reduced inside the expansion unit and the working chamber and the adjusting mechanism is locked by the frictional between the yoke and shaft.

Other features according to the invention are that a distributing slide valve and a double action check valve as a power distributor are associated with the oil press unit, the working chamber and the oil pressure pump to control the axial stroke of the yoke, and that positively controlled hydraulic limit switches are arranged in the circuit between the power distributor and the working chamber to limit the stroke of the yoke. The positive control is effected by cams arranged on the yoke.

The double action relief valve has the function of minimizing the effect of momentum on the yoke.

Yet other features of the invention are that relief valves are arranged in the feed line from the working chambers to the expansion unit which relief valves permit the flow of the oil from the working chamber only in the direction of the expansion unit and provide a direct pressure equalization between the working chambers.

It is preferred in order to shorten the pressure line to arrange the distributing slide valve and the double action relief valve in the hub shaft and to control these valves by conventional mechanical, electrical or hydraulic means from the control center. Control can be effected manually while the propeller shaft is rotating or standing still or automatic optimization may be provided in response to the output of the engine, the rate of energy or fuel consumption or the travelling speed.

In these variations the oil pressure pump can be arranged on or next to the hub shaft, drive of the oil pump being effected in a known manner by means of an electric motor or a gravity pendulum drive. The oil pump may also be arranged inside or outside the propeller shaft in order to save space, the driving essentially being taken directly from the propeller shaft or being supplied through an electric motor drive coupled with the oil pump. Finally, the oil pump may be arranged stationary inside the vehicle, which has the advantage that the adjusting of the propeller can being effected manually.

It will be appreciated that the device of the invention is particularly useful for propellers of ships. Particularly in the case of freighters, adjusting of the pitch of the propellers, in response for example to the load being carried by the ship, is highly useful. Moreover, adjusting of the pitch can also be highly desirable for the purpose of changing the velocity of the ship, particularly in channel traffic, whereby the velocity can be changed not only by changing the rate of revolution of the propeller but also by changing the pitch of the propeller blades. Compared to the devices of the prior art, the adjusting and locking device of the present invention has the advantage that short adjustment paths are realized with low construction costs and reliable locking of the propeller blades is achieved in the operating position. Moreover, the device of the invention is reliable due to its simple construction.

The invention will now be further described by reference to a specific embodiment thereof as illustrated in the drawing which is an axial partial section of a propeller hub incorporating the device of the invention.

A propeller blade 1 together with a bearing disc 2 to which the propeller blade 1 is fixed are rotatably mounted in a hub housing 3. A hub shaft 4 fixed to the hub housing 3 and a bushing 5 around the shaft 4 together comprise an expansion connection unit or expansion joint with the interface of the shaft 4 and the bushing 5 defining a joint 6. Working chambers 7 and 7' are provided at the respective sides of the joint 6. The bushing 5 is connected to a yoke 8 in the axial direction, a clearance being provided in the radial direction. Displacement of the yoke 8 is converted by a gear mechanism into rotary movement of the propeller blade 1 about the axis of the bearing disc 2. Among various known mechanisms which can be employed is that disclosed in prospectus of Messrs Fa. Lips N.V. Nederland.

The hydraulic fluid is pumped by a pump 9. Energy is provided to the pump 9 from the propeller shaft by means of gravity drive 10. Distribution of the hydraulic fluid is controlled by a distributing slide valve 12 which in turn is controlled from the interior of the ship by means of a slide valve rod 11. Hence, the hydraulic fluid is conducted to working chamber 7 or working chamber 7'. At least one annular groove 13 is provided in the joint 6. The hydraulic fluid in the working chambers 7 and 7' communicates with the annular groove 13 through respective relief valves 14 and 14' to release the joint far movement. Each of the respective relief valves 14 and 14' while permitting communication from the working chamber with which it is associated to the annular grooves 13 prevents communication in the opposite direction. When the shuttle valve 11 is adjusted to establish communication of the hydraulic fluid with the working chamber 7', axial movement of the mechanism to the left as viewed in the drawing is effected, the joint being released. On the other hand, when the shuttle valve 12 is adjusted to establish communication of the hydraulic fluid with the working chamber 7, movement of the mechanism to the right as viewed in the drawing is effected. A double-action check valve 15 is provided to prevent the momentum of the blades 1 from acting on the bushing 5. Moreover, check valve 15 improves the locking of the mechanism during the so-called "setting" or locking of the joint. The check valve 15 closes when pumping is terminated and opens when pumping is started. Limit switches 16 are provided to set the end positions of the yoke 8. Each of the limit switches 16 consist of a valve provided with a plunger 16a. When the plunger 16a is urged downwardly by a camming surface 17, the valve is opened permitting the hydraulic fluid to escape to the interior of the hub. This occurs at a predetermined end position and prevents overloading of the hydraulic system. For adjustment while the shaft is standing still, there may be provided in the interior of the ship a separately driven pump in communication with the shuttle valve 12.

While the invention has been described with reference to a specific embodiment thereof, it is to be understood that this is by way of illustration and is not intended as a limitation upon the scope of the invention as defined by the appended claims.

What is claimed is:

1. In combination with a propeller mounted on a shaft and having blades each mounted for rotation about a respective axis transverse to the axis of the shaft to adjust the blade pitch, a yoke mounted for displacement parallel to the axis of the shaft, means operatively connecting the yoke to the blades for converting the displacement of the yoke into rotation of the blades about said respective axes, the yoke being fitted on the shaft by an hydraulically operable expansion joint, an annular groove being formed at the joint, means forming a chamber at each axial end of the yoke, a pump, conduit means communication between the pump and the working chambers and the annular groove, and shuttle valve means for opening communication between the pump and either one of the chambers and simultaneously closing communication between the pump and the other of the chambers whereby the application of fluid pressure to the groove releases said joint for movement of said yoke relative to the shaft.

2. A combination according to claim 1, further comprising respective conduit means communicating between each of the chambers and the groove, a first valve means in the conduit means between one of the chambers and the groove and a second valve means in the conduit means between the other of the chambers and the groove, each of the valve means permitting passage of a fluid away from the respective chamber and preventing passage of a fluid toward the respective chamber.

3. A combination according to claim 1, further comprising limit switch means defining the limits of said displacement of the yoke in both directions, each of said limit switch means comprising a valve communicating between said conduit means and the exterior of the yoke and means for opening the valve when the yoke reaches a respective one of said limits.

4. A combination according to claim 1, further comprising check valve means in the conduit means between the shuttle valve means and the chambers for permitting passage of fluid when the pump is operating and for blocking passage of the fluid when the pump is not operating.

5. A combination according to claim 1, further comprising a hub mounting said blades and in which hub said shaft and said yoke are arranged.

6. A combination according to claim 1, further comprising gravity drive means drivably connected to the shaft and drivingly connected to the pump.

7. A combination according to claim 1, further comprising a second pump in communication with said conduit means, the two pumps being independently drivable.

* * * * *